United States Patent [19]

Vestola

[11] Patent Number: 5,782,729
[45] Date of Patent: Jul. 21, 1998

[54] METHOD FOR REGULATING LOADING OF AN ADJUSTABLE-CROWN ROLL AND AN ADJUSTABLE-CROWN ROLL

[75] Inventor: Juhani Vestola, Jyväskylä, Finland

[73] Assignee: Valmet Corporation, Helsinki, Finland

[21] Appl. No.: 589,763

[22] Filed: Jan. 22, 1996

[30] Foreign Application Priority Data

Aug. 18, 1995 [FI] Finland .................... 953895

[51] Int. Cl.$^6$ .................................. B23P 15/00
[52] U.S. Cl. .............................. 492/7; 492/20
[58] Field of Search ................. 492/2, 7, 6, 20; 100/162 B; 72/243

[56] References Cited

U.S. PATENT DOCUMENTS

| | | | |
|---|---|---|---|
| 3,430,319 | 3/1969 | Skaugen | 492/7 |
| 4,328,744 | 5/1982 | Pav et al. | 100/162 B |
| 4,429,446 | 2/1984 | Lehmann | 29/116 AD |
| 4,520,723 | 6/1985 | Par et al. | 100/162 B |
| 4,821,384 | 4/1989 | Arav | 29/113.2 |
| 4,852,229 | 8/1989 | Crouse | 72/243 |
| 4,856,157 | 8/1989 | Kusters | 29/116.2 |
| 5,060,357 | 10/1991 | Roerig et al. | 492/7 |
| 5,152,041 | 10/1992 | Link et al. | 29/116.2 |
| 5,197,174 | 3/1993 | Lehmann | 492/7 |
| 5,372,068 | 12/1994 | Lehmann et al. | 101/216 |
| 5,527,422 | 6/1996 | Lehmann et al. | 492/7 |
| 5,566,451 | 10/1996 | Niskanen et al. | 492/7 |

FOREIGN PATENT DOCUMENTS

| | | |
|---|---|---|
| 0328502 | 8/1989 | European Pat. Off. . |
| 875213 | 11/1987 | Finland . |
| 79178 | 7/1989 | Finland . |
| 925761 | 12/1992 | Finland . |
| 4203497 | 8/1993 | Germany . |
| 61-24814 | 2/1986 | Japan . |
| 9102173 | 2/1991 | WIPO . |

*Primary Examiner*—Irene Cuda
*Attorney, Agent, or Firm*—Steinberg, Raskin & Davidson, P.C.

[57] ABSTRACT

A method for regulating the loading of adjustable-crown roll having a stationary roll axle around which a roll mantle is rotatingly mounted, and of which roll a nip is formed with a backup roll. The deflection of the roll mantle and/or the linear load in the nip is regulated by loading elements and a backup zone supported on the roll axle and acting upon the inner face of the roll mantle in the direction of the nip plane. Upon the inner face of the roll mantle of the roll of the backup zone/zones, a sum force is produced which acts in the nip plane in a direction substantially opposite to the force produced by the loading element, and the force effect applied by the backup zone/zones to the inner face of the roll mantle is applied, examined in the direction of the circumference, to more than one point. The adjustable-crown roll forms a nip with a backup roll and includes a stationary roll axle around which a roll mantle is arranged revolving, between which roll mantle and roll axle loading elements and backup zones are arranged to act upon the inner face of the roll mantle and are supported on the roll axle. The backup zones supported on the roll axle are formed of at least two rows of backup-zone elements or by a backup chamber or by at least one row of backup-zone elements and a backup chamber. The sum force produced by the elements or chamber in the nip plane is in a direction substantially opposite to the force produced by the row of loading elements.

36 Claims, 10 Drawing Sheets

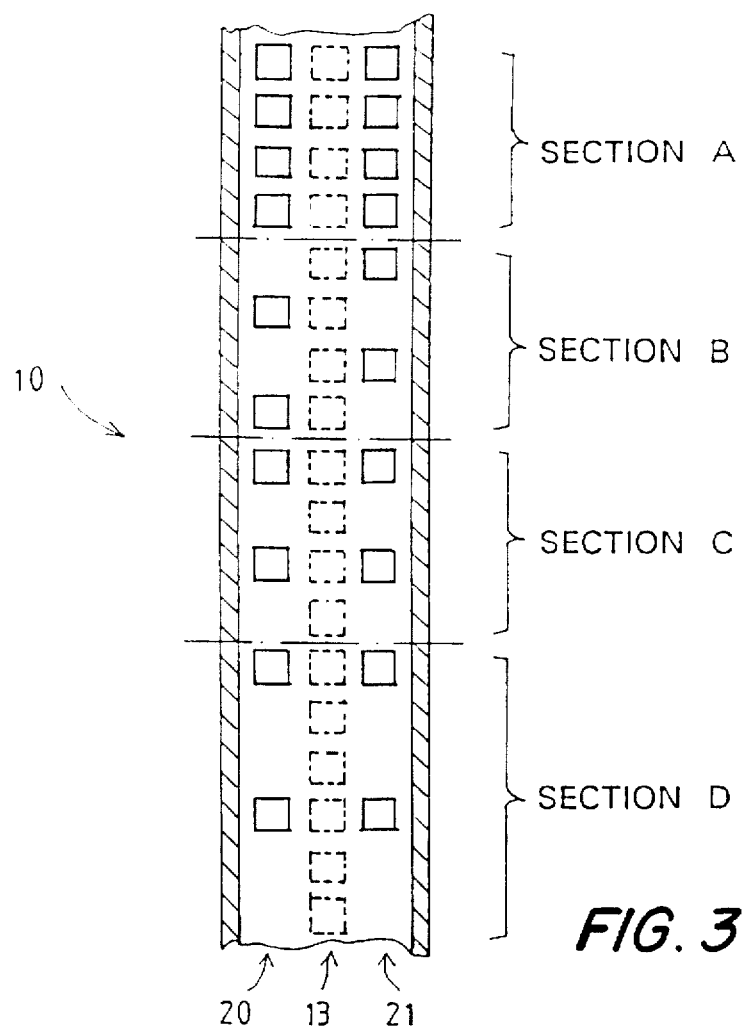
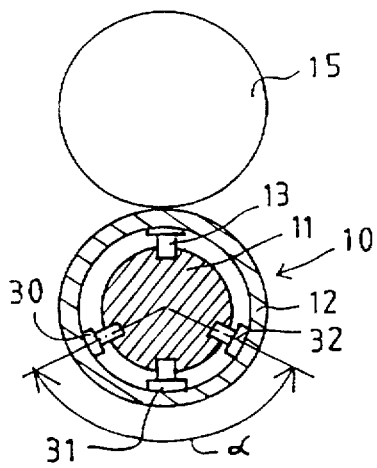 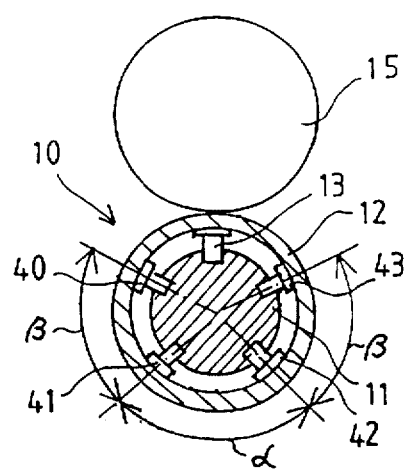 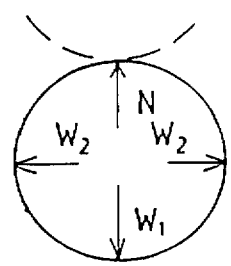
FIG. 3
FIG. 4A     FIG. 4B     FIG. 5

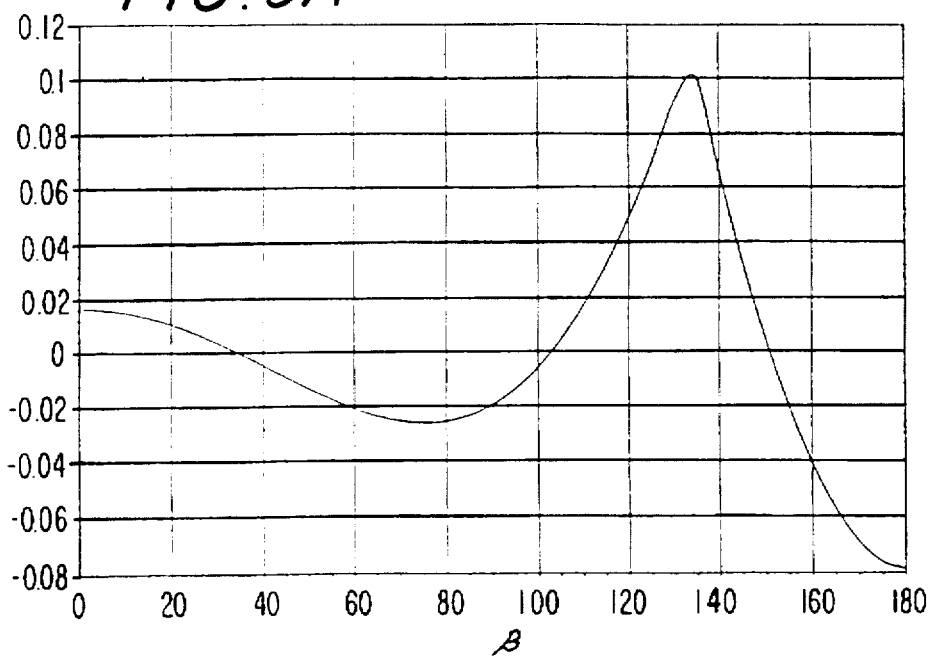
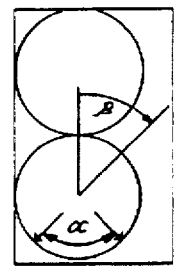
FIG. 9A
FIG. 9
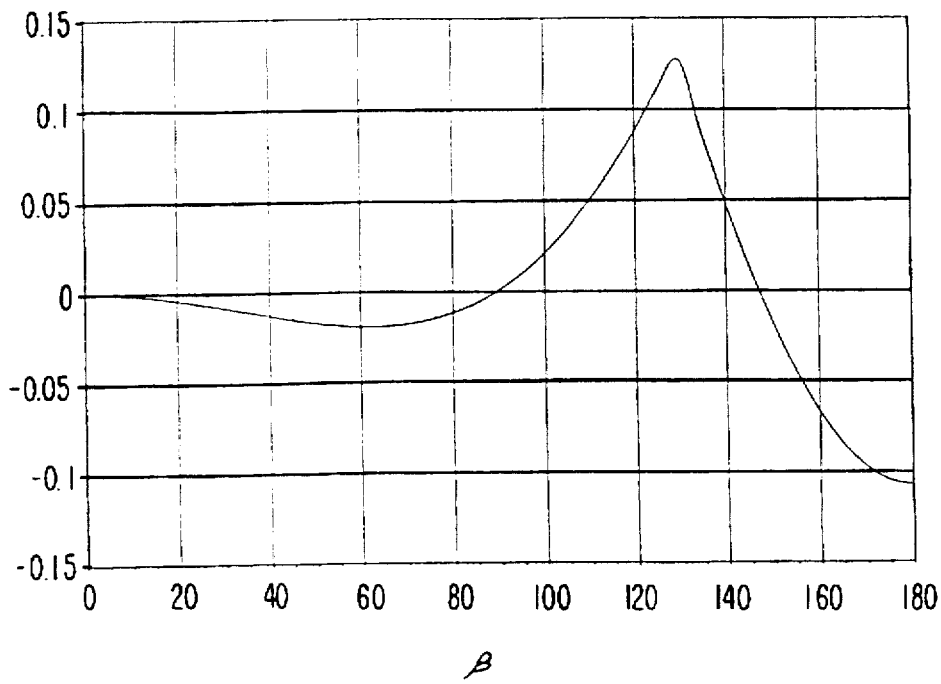
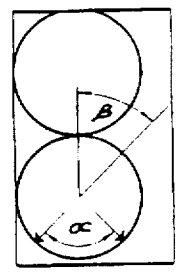
FIG. 10A
FIG. 10

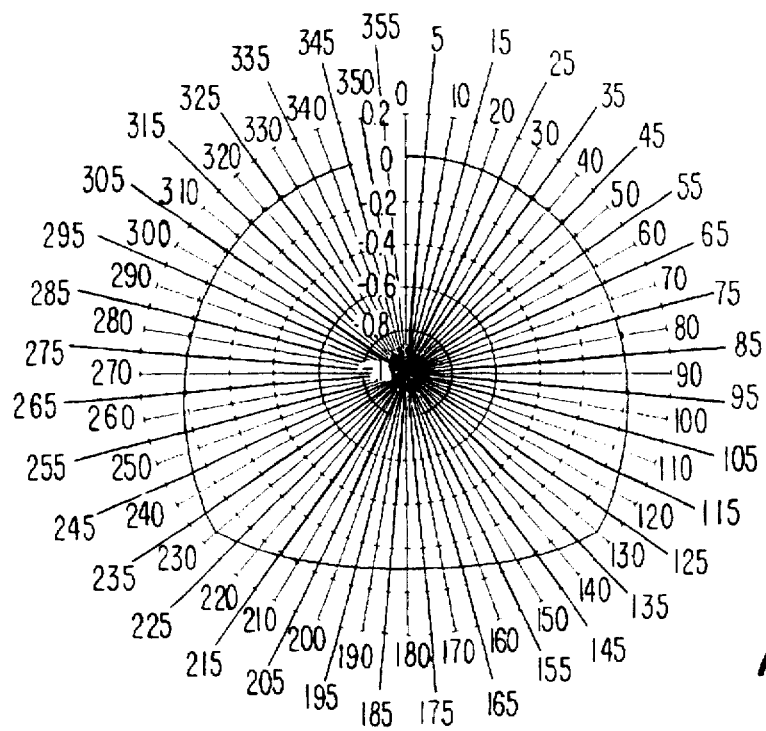
FIG.11
FIG.12A
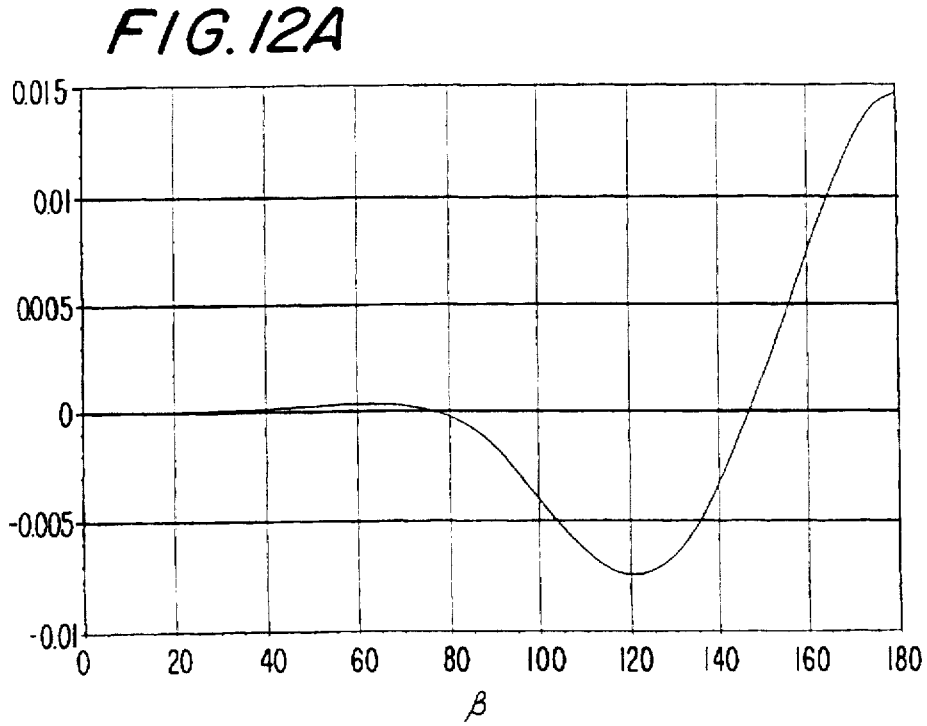
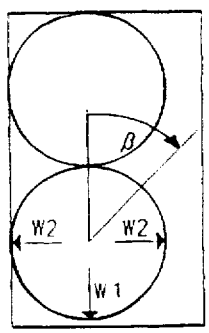
FIG.12

FIG.17
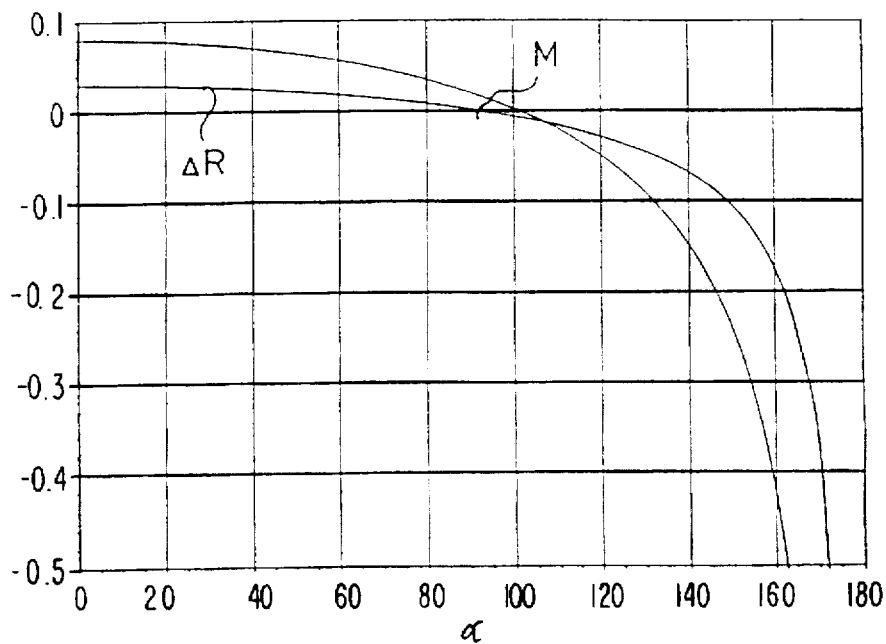
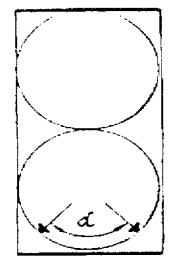
FIG.17A
FIG.18
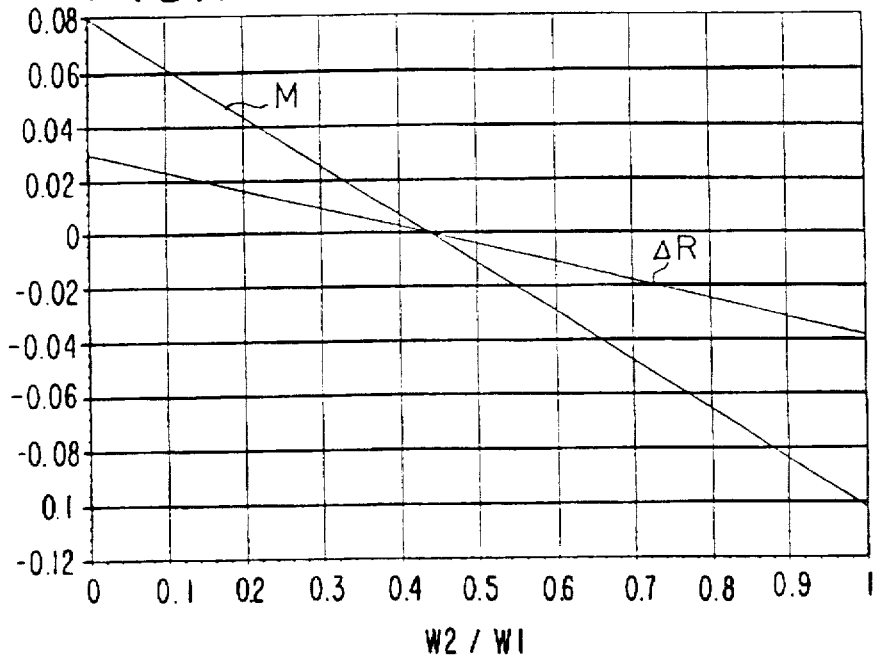
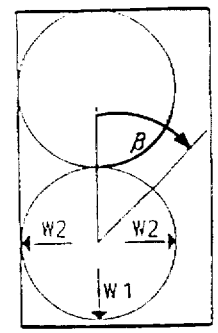
FIG.18A

METHOD FOR REGULATING LOADING OF AN ADJUSTABLE-CROWN ROLL AND AN ADJUSTABLE-CROWN ROLL

FIELD OF THE INVENTION

The present invention relates to a method for regulating the loading of an adjustable-crown roll arranged in a nip-defining relationship with a backup roll. The adjustable-crown roll comprises a stationary roll axle around which a roll mantle revolves. The deflection of the roll mantle and/or the linear load in the nip is regulated by loading elements and backup zone elements supported on the roll axle and acting upon an inner face of the roll mantle in the direction of a nip plane defined as the plane passing through the central axis of the adjustable-crown roll, the nip and the backup roll.

The invention also relates to an adjustable-crown roll which operatively forms a nip with a backup roll and which comprises a stationary roll axle around which a roll mantle is arranged to revolve. Between the roll mantle and roll axle, loading elements and backup zone elements are arranged to operatively act upon an inner face of the roll mantle and are supported on the roll axle.

BACKGROUND OF THE INVENTION

In the prior art, a number of different adjustable-crown rolls for a paper machine or for paper finishing devices are known, for which rolls various designations are used, such as a profilable roll, variable-crown roll, roll adjustable in zones, and other equivalent terms. Generally, these rolls comprise a solid massive, or tubular, stationary roll axle and a roll mantle rotatably mounted about the axle. Between the axle and the mantle, glideshoe arrangements acting upon the inner face of the roll mantle and/or a chamber for pressure fluid are situated so that the axial profile of the mantle at the nip can be aligned or regulated as desired.

When a roll adjustable in zones (such as a roll provided with hydraulic loading elements) is operated with low linear loads, in some cases it becomes a problem that, in some zone, a negative pressure should to be achieved. As a rule, this problem is solved by using backup-zone elements which act in a direction directly opposite to the direction in which the loading elements act. The backup-zone elements used in one row, however, cause yet another problem in that they produce stresses on the roll mantle, in particular at the nip, in which the peak produced by the nip and by the loading elements is also effective. This stress peak, together with the stress mentioned above, may become so high that it restricts the capacity of regulation of the arrangement, i.e., the loading capability of the loading elements. The back-up shoes placed in this manner also occupy space so that, for a certain application, it may be necessary to choose an adjustable-crown roll of a larger size category to provide for sufficient room for such shoes.

With respect to the prior art, reference is made to Finnish Patent Application No. 875213, corresponding to U.S. Pat. No. 4,856,157 which is incorporated by reference, which describes a roll whose linear load can be controlled in the longitudinal direction of the roll. In this prior art arrangement, the area between the revolving hollow roll and the stationary roll axle is sealed in the axial direction and is filled with pressure fluid. This prior art roll includes a device by whose means pressure fluid at a desired pressure can be passed into at least one limited part of the intermediate space and annular sealing members arranged in the intermediate space of the roll axle and placed against the inner face of the cavity space. The annular sealing members divide the intermediate space of the roll into opposite areas. In these areas, the ducts provided in the roll axle terminate and these areas are connected with a valve system by whose means the areas, in which press members can produce a higher or lower pressure against the inner face of the cavity space as compared with the pressure present in the intermediate space, can be made to communicate with an area in whose intermediate space a lower pressure is present. Into the intermediate space remaining outside the areas of the press members, pressure fluid can be passed. This prior art construction requires quite a large amount of power, in particular when the roll is operated at very high running speeds of a paper machine or a coating device, such as speeds higher than 1200 meters per minute.

Further, with respect to the prior art, reference is made to Finnish Patent No. 79,178 which corresponds to European Patent Publication No. 0 328 502, which is the current assignee's patent of earlier date, and which relates to a method for equalization of the temperature profile of an adjustable-crown roll as well as a roll intended for carrying out the method. In addition to the loading elements proper in the roll, the roll in accordance with this Finnish patent comprises so-called backup-zone elements arranged in certain areas of the roll and acting in the opposite direction. The backup-zone elements are used especially in cases in which a very low linear load must be achieved in a roll nip. Since the backup-zone elements and the loading elements proper placed directly opposite thereto together would cause a considerable increase in temperature in the temperature profile of the roll, in the roll in accordance with FI Patent No. 79,178, the backup-zone elements and the loading elements proper placed opposite to them are interconnected hydraulically or mechanically. The connection is such that, when the inner face of the roll mantle is loaded by means of backup-zone elements, the loading elements proper placed in corresponding locations are retracted completely from acting upon the inner face of the roll mantle.

Further, with respect to the prior art, reference is made to the published International Patent Publication No. WO 91/02173, corresponding to U.S. Pat. No. 5,197,174, which describes a roll in which, in the lateral areas of the roll, additional spreader elements are provided, which act in a direction perpendicular to the nip plane and shape the roll mantle elliptically. By means of this arrangement, attempts have been made to reduce the force of the hydraulic loading elements operating in the nip plane in the lateral areas of the roll.

With respect to the prior art, reference is also made to U.S. Pat. No. 4,821,384 which describes a roll arrangement of a type similar to that described above, in which additional loading elements are provided in the lateral areas of the roll. Roll arrangements of a similar type are also described in Finnish Patent Application No. 925761, which corresponds to U.S. Pat. No. 5,060,357, and in U.S. Pat. No. 4,852,229.

Also, with respect to the prior art, reference is made to U.S. Pat. No. 4,520,723 which describes a construction in which the function of the backup shoes that are used is to neutralize the effects of transverse forces and to keep the mantle of a roll with a mobile mantle in the nip plane, which has been arranged in some other prior art constructions by means of guides placed in the end areas between the axle and the mantle. In this particular prior art construction, the transverse force is produced by passing different pressures to different sides of the dual pistons of the shoes or, in a backup-shoe construction with shoes in two rows, by passing different pressures into the backup shoes. As to the construction, the pressures passed into the cylinders are separately adjustable. This arrangement is quite complicated because, in order to produce the transverse force described herein, backup-shoe elements placed in the lateral areas alone would be adequate.

OBJECTS AND SUMMARY OF THE INVENTION

Accordingly, it is an object of the present invention to eliminate the problems described above and to provide a new and improved method and roll by whose means a substantially larger range of regulation is obtained for the profitable or adjustable-crown roll as compared with prior art constructions.

Another important object of the invention is to widen the range of regulation of an adjustable-crown roll downwards, i.e., toward lower nip loads.

A more particularly important object of the invention is to widen the range of regulation by optimizing the locations of the backup zones and the magnitude of the force effects so as to minimize the stress level and to minimize the deformations produced by the backup zones in the nip.

It is a further object of the invention to minimize the problems caused by the backup-zone elements, in particular the stresses and the deformations in the roll mantle, in particular in the nip, in which the stress peak produced by the loading elements and by the nip is also placed.

Further, an object of the invention is, in some applications, to provide a pre-stress of the desired magnitude in the nip by means of the backup zones, in which case the overall stresses can be minimized.

In view of achieving the objects stated above, others and those that will come out later, the method in accordance with the invention is mainly characterized in that a sum force in a direction substantially opposite to the force produced by the loading element is produced by means of at least one backup zone in which a plurality of forces are applied to the inner face of the roll mantle of the roll and that the force effect applied by the backup zone/zones to the inner face of the roll mantle is applied to more than one points when viewed in the direction of the circumference of the roll.

The roll in accordance with the invention generally comprises backup zones supported on the roll axle and formed by means of at least two rows of backup zone elements or by means of a backup chamber, into which a medium is passed to apply pressure to the inner face of the roll mantle, or by means of at least one row of backup zone elements and a backup chamber. The sum force produced by the elements and/or backup chamber in the nip plane is in a direction substantially opposite to the force produced by the row of loading elements in the loading direction of the nip.

In the arrangement in accordance with the present invention, the inner face of the roll mantle is acted upon over an area which is, in the direction of the circumference, substantially wider than one row of backup shoes, by means of backup-zone elements placed in at least two rows in the longitudinal direction of the roll or by means of at least one backup chamber or by means of at least one backup chamber and one or several backup-zone elements. By means of the backup zones, a sum force is produced which acts in the nip plane in a direction opposite to the force produced by a loading element.

When an arrangement in accordance with the invention is used, the stress level applied to the roll mantle, in particular in the nip, is lowered and the deformations produced by the backup zones in the nip are substantially minimized.

Minimization of the deformation produced by the backup zones in the nip simplifies the regulation of the roll in zones, improves the precision of such regulation, and permits the use of fewer backup-zone elements in the axial direction, whereby a simpler roll construction is achieved.

By means of an arrangement in accordance with the invention, a wider range of regulation is obtained, in particular toward lower nip loads, when backup-zone elements placed in at least two rows and/or at least one backup chamber is/are utilized. In particular with a low linear load, the profiling capacity is limited by the fact that low or negative pressures cannot be employed in the loading elements. In the present invention, this problem has been solved by means of shifting of the zero point of loading pressure which is achieved by means of a backup force. In such a case, in particular with a low linear load, a large profiling range is achieved.

According to the invention, it is possible to employ either backup-zone elements and/or a backup chamber with an invariable load, or elements or a chamber which can be adjusted as rows or separately, however, so that the overall backup force produced by them acts substantially in the direction of the nip plane.

In the exemplifying embodiments of the invention, the deformations and stresses produced in the nips by the backup-zone elements and/or by the backup chamber are minimized by means of their suitable positioning around the circumference of the roll and by means of appropriate choice of the force magnitudes.

According to a preferred exemplifying embodiment of the invention, the stresses produced by the backup zones in the nip are arranged such that the overall stresses in the roll mantle are minimized.

According to an embodiment of the invention, at least two rows of backup-zone elements are employed, in which rows the backup-zone elements are placed in the longitudinal direction of the roll opposite to the loading elements, for example opposite to every second or third loading element or as placed in a suitable way less frequently either so that, in each row, the backup-zone elements are placed in the longitudinal direction of the roll at the same location in relation to one another, or they are placed alternatingly. The backup-zone elements placed in each row are placed substantially over the entire length of the roll at a distance from one another. A backup zone can also extend as a substantially continuous backup-zone element across substantially the entire length of the roll.

The angle between the rows of backup-zone elements in the cross direction of the roll is selected depending on the number of rows, the aim in principle being to place the rows of backup-zone elements so that their sum force acts away from the nip. The angles between the backup-zone elements and the relative magnitudes of the forces are selected so that the deformations and/or stresses can be optimized.

According to the invention, in an adjustable-crown roll, intensified regulation of the profile and minimization of the stresses and/or deformations effective in the nip can also be achieved by using a roll in which the overall backup force effective in the nip is produced by using one or more backup chambers. This exemplifying embodiment is suitable in particular when low running speeds of a paper machine are used, for example lower than about 1200 meters per minute. The scope of the invention also includes embodiments in which backup-zone elements and a backup chamber are placed in the same adjustable-crown roll so that the overall force produced by these elements and chamber acts substantially in the direction of the nip plane. In one particular embodiment in accordance with the invention, the device comprises a roll in which the backup zone is produced by means of a backup chamber and continuous backup-zone elements are used at the edges of the chamber as axial seals.

According to the invention, the locations and force effects of the backup-zone elements and/or chambers are preferably substantially symmetric in relation to the nip plane.

Thus, it can be stated that, according to the invention, a backup zone for an adjustable-crown roll can be produced either by using a backup-zone element or by using a backup chamber which is defined by lateral seals both by means of axial seals and by means of end seals. The backup-zone elements may be continuous backup shoes, such a shoe being a continuous shoe and comprising a construction that loads the shoe. A backup-zone element can also be formed out of a row of backup shoes which comprises individual backup shoes placed in a row at a distance from one another. According to the invention, it is a characteristic feature of a backup zone that the force effect of the backup zone on the inner face of the mantle is applied, when viewed in the direction of the circumference, to more than one point or location, over an area substantially larger than in the arrangement known from the prior art, in which just one backup-zone element is employed and in which the sum force of the backup-zones in the nip plane is opposite to the force produced by the opposite loading element(s). According to an embodiment of the invention, at least two backup-zone elements are used, which are either continuous elements or rows of backup shoes, or at least one backup chamber and at least one backup-zone element are used. The backup-zone element is either a continuous backup-zone element or a row of backup shoes, or at least one backup chamber alone is used. The backup zone in accordance with the invention is distributed axially substantially over the entire length of the roll and, when a row of backup shoes is employed, backup shoes can be placed either with the same spacing as the loading shoes, or with a less dense spacing either with an even or alternating spacing in relation to the loading shoes or between the loading shoes or with a different spacing or with a random spacing. According to the invention, in a backup zone, all the forces produced by the elements in the backup zone can be invariable, or the force level in the chambers and the relative magnitudes of the forces are regulated by means of the elements while the sum force remains in the nip plane. According to an exemplifying element, the individual shoes or groups of shoes in the rows of backup shoes are regulated separately.

As some preferred exemplifying embodiments of the invention, an example can be mentioned in which two backup-zone elements are used between which the angle is substantially larger than 0° and substantially smaller than 1800, preferably from about 50° to about 140°. As highly favorable cases, it should be mentioned the angle values of about 92.6° or about 101.2°, in which cases the deformation of the circumference and the circumferential moment, respectively, are substantially 0 at the nip location. Also, a favorable value of the angle is about 120°, in which case the overall stresses on the roll mantle are minimized.

When three backup-zone elements are used, the middle backup-zone element is placed at the opposite side of the nip, and the angle between the extreme backup shoes is substantially larger than 0° and substantially smaller than 360°, preferably about 180°, and the ratio of the forces produced by the extreme rows of elements to the forces produced by the middle row is from about 0.1 to about 1.2, in which case the deformation of the circumference and the circumferential moment are, in practice, both of them simultaneously zero if the ratio of these forces is from about 0.437 to about 0.438. If one backup chamber is employed, its width is preferably from about 80° to about 300°, and with the angle values of about 180°, a situation is reached in which the deformation of the circumference is zero and, with the angle value of about 193.6°, the circumferential moment is zero. Other angular values between 180° and 193.6° are also suitable. Also, a further preferred exemplifying embodiment is one in which there is a backup chamber which is defined and sealed by two continuous backup shoes.

In the following description, for the sake of simplicity, for a loading element, the phrase "loading shoe" is used, and for a backup-zone element, the phrase "backup shoe" is used.

BRIEF DESCRIPTION OF THE DRAWINGS

The following drawings are illustrative of embodiments of the invention and are not meant to limit the scope of the invention as encompassed by the claims.

FIG. 3 is a schematic longitudinal sectional view of an adjustable-crown roll in which two rows of backup shoes are used;

FIG. 4A is a schematic illustration of an exemplifying embodiment of the invention in which there are three rows of backup shoes;

FIG. 4B is a schematic illustration of an exemplifying embodiment of the invention in which there are four rows of backup shoes;

FIG. 5 is a schematic illustration of the forces effective in an adjustable-crown roll 30 when three rows of backup shoes are used;

FIG. 9 illustrates the coefficient of circumferential moment of the mantle when two rows of backup shoes are used, between which the angle is about 92.6°, in a situation in which the deformation of the circumference in the nip is 0;

FIG. 10 illustrates the coefficient of circumferential moment when two rows of backup shoes are used and the angle between the backup shoes is about 101.2°;

FIG. 11 shows the curve of FIG. 10 in a polar system of coordinates;

FIG. 12 illustrates the coefficient of deformation of circumference when three rows of backup shoes are used, wherein $W_1=1$, $W_2=0.437$, and wherein the angle between the extreme rows of shoes is about 180°;

FIG. 17 illustrates the coefficient of circumferential moment and the coefficient of deformation of the circumference at the nip when two rows of backup shoes are used and when the angle between these rows changes;

FIG. 18 illustrates the coefficient of circumferential moment and the coefficient of deformation of the circumference at the nip when three rows of backup shoes are used and when the angle between the extreme rows of backup shoes is about 180°.

DETAILED DESCRIPTION OF THE INVENTION

Figure 1A:
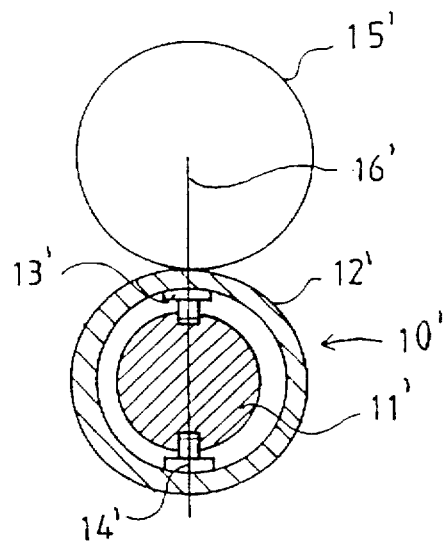
FIGS. 1A and 1B are schematic illustrations of a prior art adjustable-crown roll.

FIG. 1A shows a prior art adjustable-crown roll 10' which comprises a massive central axle 11' and a roll mantle 12' which is revolving mounted on the axle 11'. Loading elements 13' are supported on the roll axle 11' and positioned to act upon an inner face of the mantle 12' in the direction of a nip plane 16 defined as the plane passing through the central axis of the roll axle 11' and the central axis of a backup roll 15' in nip-defining relationship with the roll 10'. Backup-zone elements 14' are also supported on the roll axle 11' and positioned to act in the nip plane 16 in a direction opposite to the loading direction of the loading elements 13'. Thus, the angle between the row of backup-zone elements 14', e.g., back-up shoes, and the row of loading shoes 13' is 180°. The end bearings and any other accessories in the roll as well as more detailed features of construction of the roll have been omitted in the figures for the sake of clarity. This construction typifies prior art adjustable-crown rolls including in the longitudinal direction, one row of loading elements 13' and one row of backup shoes 14', which are placed at a distance from one another.

Figure 1B:
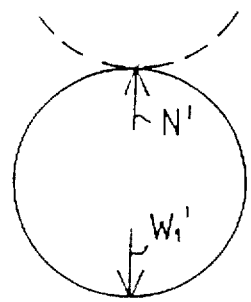
Figure 14:
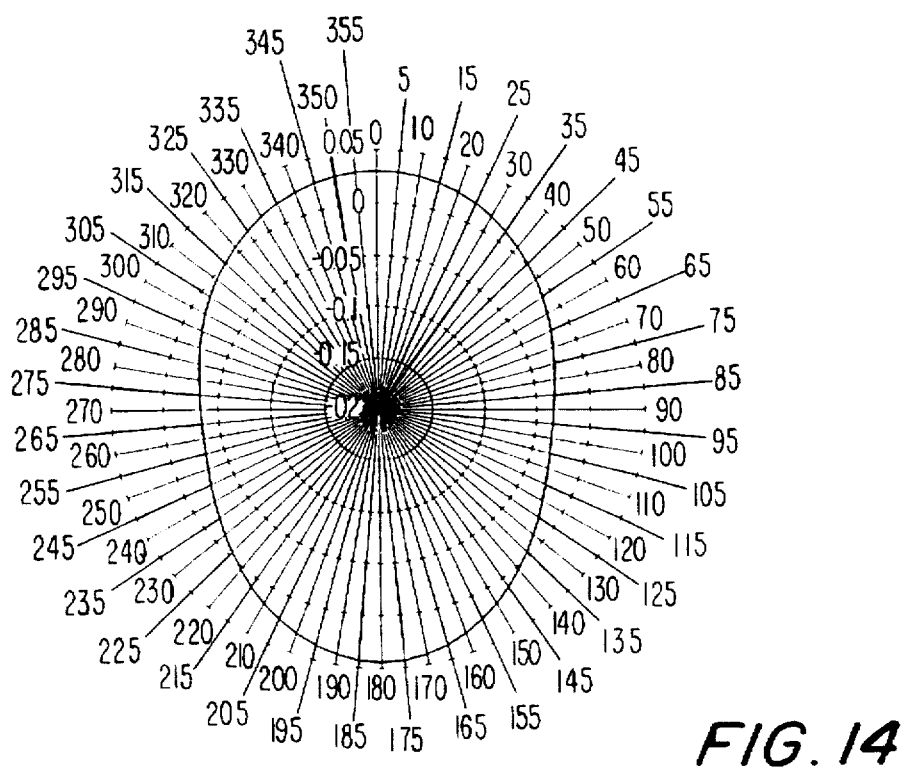
FIG. 14 shows the curve of FIG. 13 in a polar system of coordinates (prior art)
Figure 15A:
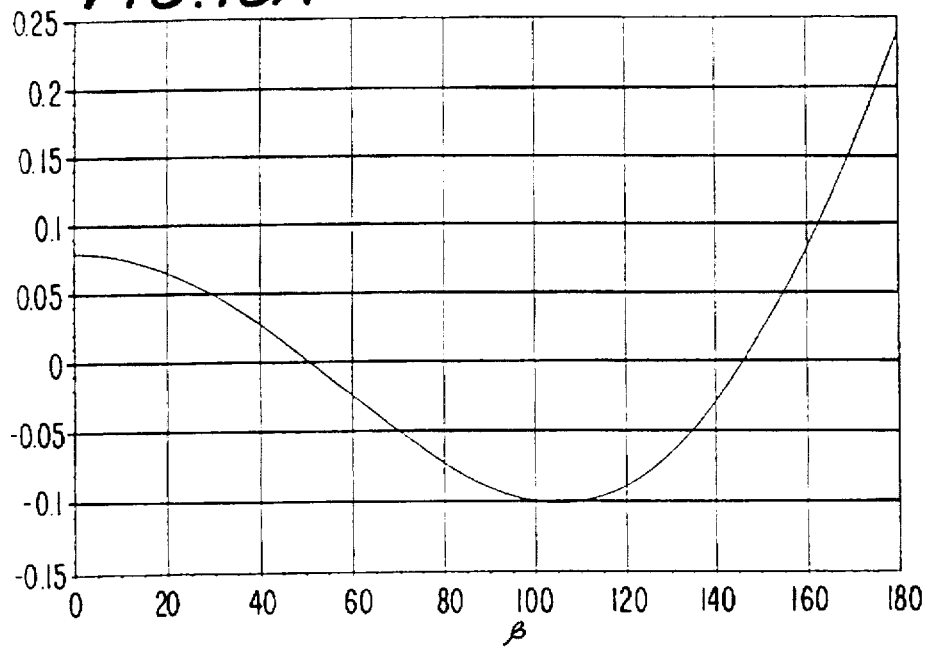
FIG. 15 illustrates the coefficient of circumferential moment when one row of backup shoes is used (prior art)
Figure 15:
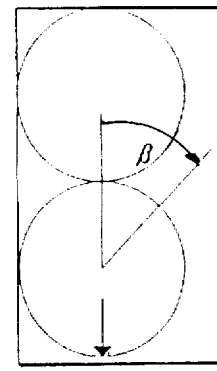
Figure 16:
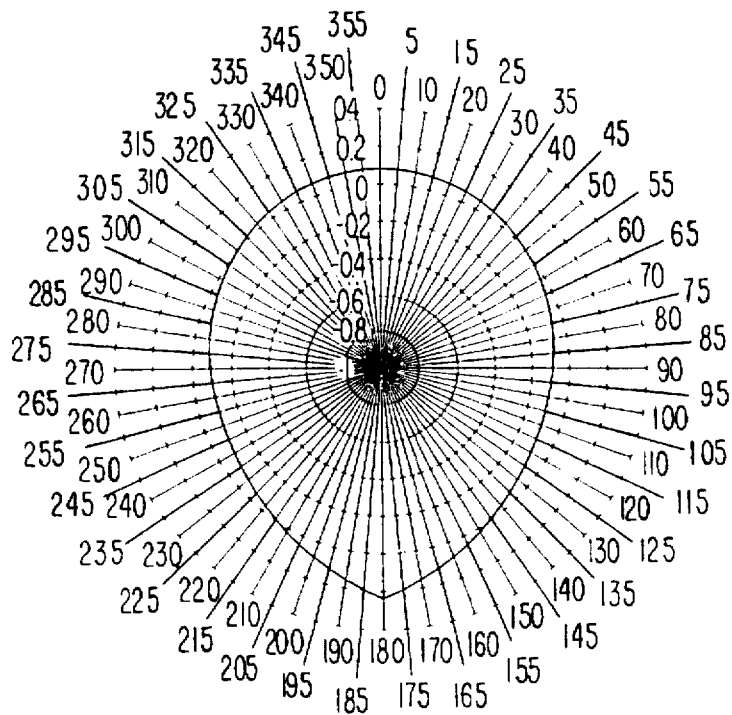
FIG. 16 shows the curve of FIG. 15 in a polar system of coordinates (prior art)

FIG. 1B illustrates the internal forces effective in an adjustable-crown roll in the embodiment as shown in FIG. 1A. The loading elements 13', e.g., loading shoes 13', produce a force N' in the nip plane 16 defined between the adjustable-crown roll 10' and the backup roll 15' in a direction toward the backup roll 15', and the backup-zone elements 14', i.e., the backup shoes, produce a force $W_1'$ in the opposite direction. In this case, the deformation of the circumference is large. The deformation as a function of the angle $\beta$ from the loading direction in the nip plane can be seen in FIGS. 13 and 14. As seen in FIGS. 15 and 16, the circumferential moments are high, the coefficient of moment at the nip is 0.08, and the maximum is at the force $W_1$,0.24. The coefficients of the moment are proportional to the circumferential stresses in the roll mantle.

In FIGS. 7–19, different embodiments in the invention and the prior art are compared by comparing the stresses (in terms of the coefficient of the circumferential moment) and radial deflections (in terms of the coefficient of deformation of the circumference) caused by backup-zone elements. The most exact calculation method to compute these coefficients would be the so-called finite element method, which is also used in the final optimization of each practical case. However, in order to make the comparison simple with clearly defined curves, the coefficients are calculated for the embodiments in FIGS. 7–19 using commonly known analytical formulas of stresses and strains. To accomplish this, certain simplifications have been made without causing any significant effect on the comparative conclusions, e.g., the weight of the mantle has been neglected, the backup-zone elements are assumed to be continuous in the axial direction and the mantle is assumed to thin in relation to its diameter.

Figure 6A:
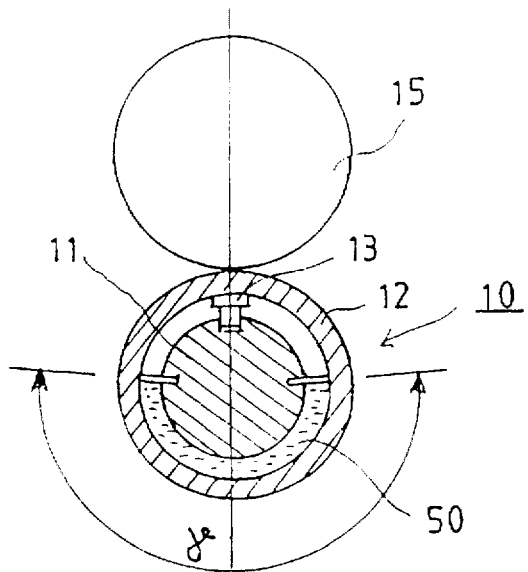
FIG. 6A is a schematic illustration of an exemplifying embodiment of the invention in which one backup chamber is used.

The analytical formulas of the circumferential moment and the deformation for concentrated and distributed loads used in the embodiments of FIGS. 1A and 6A are commonly known and can be found in literature in the art. Analytical formulas used for all of the other embodiments are formed using the commonly used principle of superposition.

In order to enable a direct comparison between the embodiments in FIGS. 7–19, the sum force of the backup-zones is set equal in all cases and dimension-free coefficients of the moment and deformation are utilized. For a certain roll mantle, the coefficient of the circumferential moment is directly proportional to the ring bending moment and thus also to the circumferential stresses. In a similar manner, the coefficient of deformation of the circumference is directly proportional to the circumferential deformation (i.e., the radial deflection).

In the following description of preferred embodiments of the present invention, the details of construction of the backup shoes or the backup chambers will not be discussed in detail because, based on the prior art, they are obvious to a person skilled in the art.

Figure 1C:
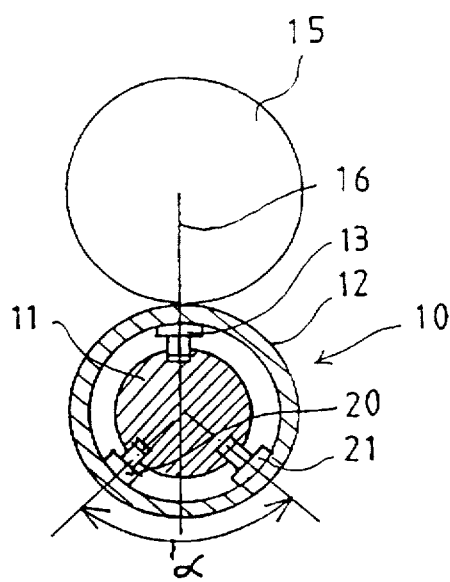
FIG. 1C is a schematic illustration of an exemplifying embodiment of the invention in which two rows of backup shoes are employed.

Referring to the accompanying drawings wherein the same reference numerals refer to the same or similar elements in the method and apparatus in accordance with the invention, as shown in FIG. 1C, the adjustable-crown roll 10 comprises a longitudinal row of loading elements 13 and longitudinal rows of backup-zone elements which are arranged between the revolving mantle 12 and the massive, static, stationary central axle 11. In the longitudinal direction of the roll 10, there are several backup-zone elements, i.e., backup shoes 20,21, in a row one after the other spaced at a distance from one another. The backup-zone element may also be continuous and extend across longitudinal portions of the roll 10, and even the entire width of the roll 10. The angle $\alpha$ between the rows of backup shoes, or the continuous backup shoes, 20,21, is $0<\alpha<180°$, and the angle between the backup shoes 20,21 is selected so that the deformations/stresses can be optimized, e.g., by experimentation and trial evaluations. In the choice of the angle $\alpha$, it is also taken into account that the sum force of the forces $W_2$ of the backup shoes 20,21 (FIGS. 2A and 2B) in the nip plane 16 acts in the direction away from the nip.

Figure 2A:
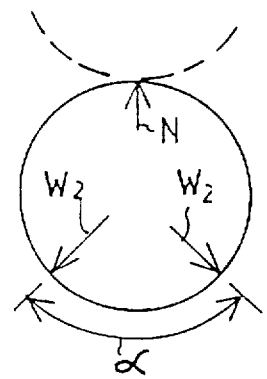
FIGS. 2A and 2B illustrate the forces effective in an adjustable-crown roll when two rows of backup shoes are used, with different values of the angle between the rows.
Figure 2B:
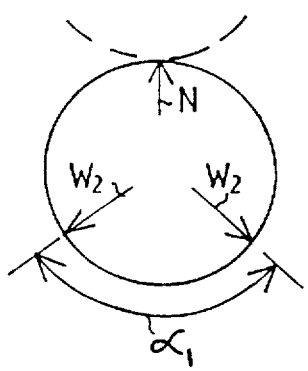

FIGS. 2A and 2B illustrate the internal forces effective in the roll 10 when an exemplifying embodiment as shown in FIG. 1 is used, i.e., a roll having two rows of backup shoes 20,21 with different values of the angle $\alpha$. The loading forces of the backup shoes 20,21 may be selected independent of each other as well as independent of the loading forces provided by the loading elements 13 to obtain optimal operating conditions.

Figure 7A:
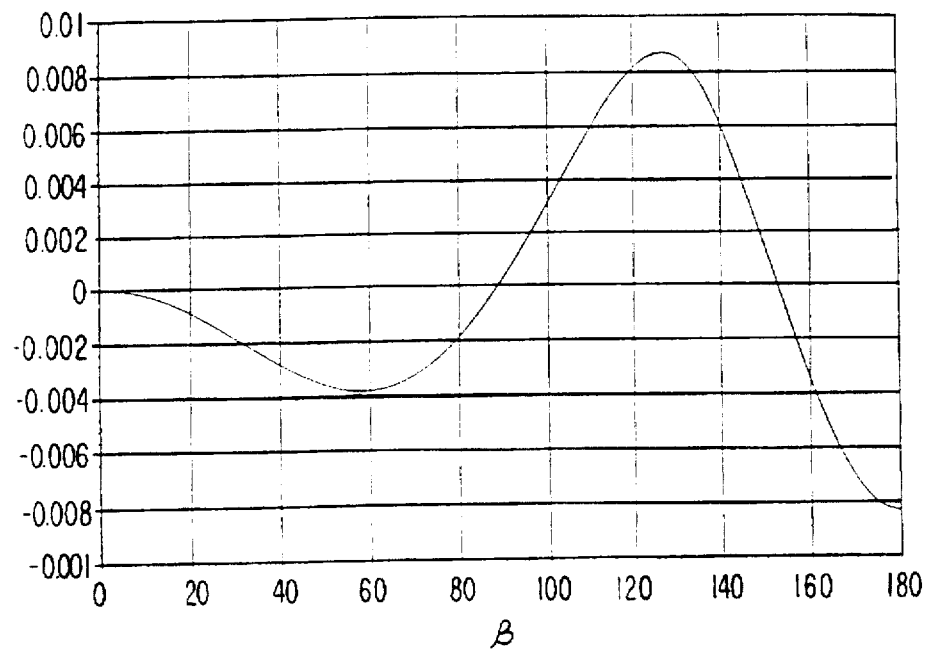
FIG. 7 illustrates the coefficient of deformation of circumference when two rows of backup shoes are used, between which the angle is about 92.6°.
Figure 7:
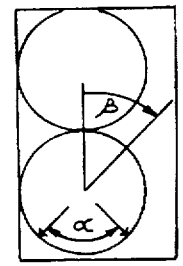
Figure 8:
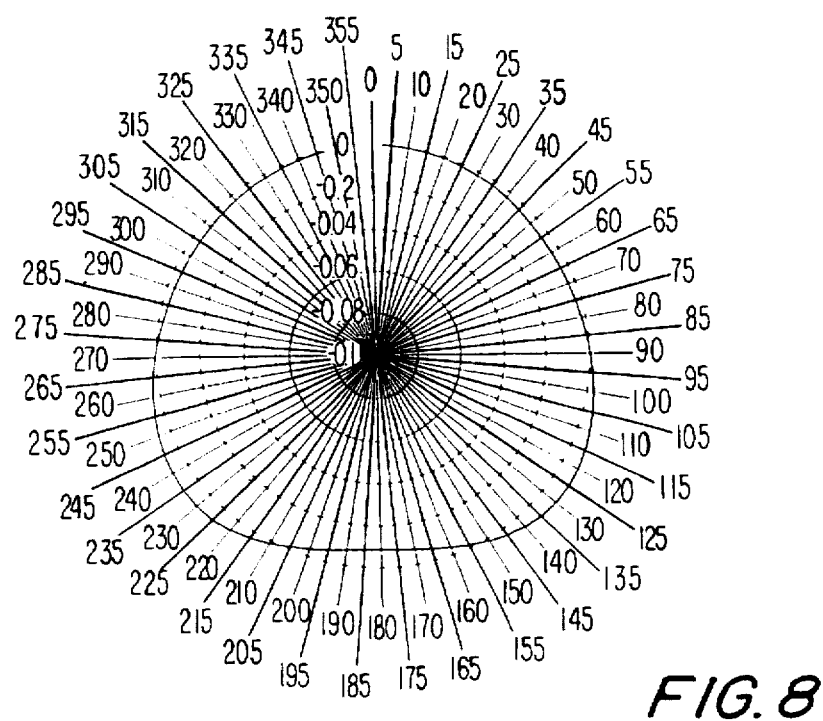
FIG. 8 shows the curve of FIG. 7 in a polar system of coordinates.

In FIG. 2A, the angle α between the rows of backup shoes 20,21 is about 92.6°, in which case the deformation of the circumference at the nip is 0, as seen in FIGS. 7 and 8 which show the deformation as a function of the angle β from the loading direction in the nip plane, and the coefficient of circumferential moment at the nip is less than about +0.02, and the maximum at $W_2$ is about +0.10, which is seen in FIG. 9. This is a highly favorable exemplifying embodiment of the invention.

In FIG. 2B, the angle $α_1$ between the rows of backup shoes 20,21 is about 101.2°, in which case the circumferential moment at the nip is 0, and the maximal coefficient at $W_2$ is about 0.13. This exemplifying embodiment is illustrated by FIGS. 10 and 11.

When it is desirable to minimize the overall stresses in the roll mantle, in one embodiment, it has been found that the angle between the rows of backup shoes 20,21 is favorably selected to be about 120°.

FIG. 3 is a longitudinal sectional view of an adjustable-crown roll 10 as shown in FIG. 1 showing the rows of backup shoes 20,21 which may be arranged in the longitudinal direction, relative to the uniform spacing of the loading elements 13, with equal spacing (section A) so that there is one-to-one correspondence or with a less dense spacing (section B-two-to-one correspondence with the loading elements 13, section C-two-to-one correspondece with the loading elements 13, section D-three-to-one correspondece with the loading elements 13) either alternatingly in each row (section B) or such that every second shoe is eliminated in each row (20,21)(section C), or every third shoe is retained (section D). The row of loading shoes 13 is illustrated by the dashed lines. In one roll 10, in the longitudinal direction, it is possible to use either positioning of the backup shoes 20,21 in accordance with any one of the sections A, B, C, D, or combinations of the different sections A, B, C and D selected appropriately as required or desired. In the longitudinal direction, the backup shoes 20,21 can also be arranged between the loading shoes 13 or with an arbitrary spacing in relation to the loading shoes.

FIG. 4A shows an exemplifying embodiment of the invention which is in the other respects similar to the exemplifying embodiment shown in FIG. 1, but the adjustable-crown roll 10 includes three rows of backup shoes 30,31,32. In this embodiment, the angle α between the extreme rows of backup shoes 30,32 is substantially larger than 0° and smaller than 360°, and the middle shoe 31 is placed opposite to the loading shoe 13, i.e., the angle between the loading shoe 13 and the middle row of backup shoe 31 is 180°. The effects of the forces produced by the loading shoes and by the backup shoes 30,31,32 in this exemplifying embodiment is seen in FIG. 5 and FIG. 12. In the calculation illustrated in FIG. 12, the angle α=180°, and $W_2$=0.437×$W_1$, the deformation of the circumference at the nip is 0. In such a case, the circumferential moment at the nip is also 0, which comes out from FIG. 18.

The exemplifying embodiment shown in FIG. 4B is in most other respects similar to the exemplifying embodiments shown in FIGS. 1 and F4A, but the adjustable-crown roll includes four rows of backup shoes 40,41,42,43, and the angles are determined so that the angle α is substantially larger than 0, and α+2β is substantially smaller than 360°. In this regard, it is understood that more than four rows of backup-zone shoes can be arranged on the roll axle to act upon the inner face of the roll mantle without deviating from the scope of the invention.

Figure 6B:
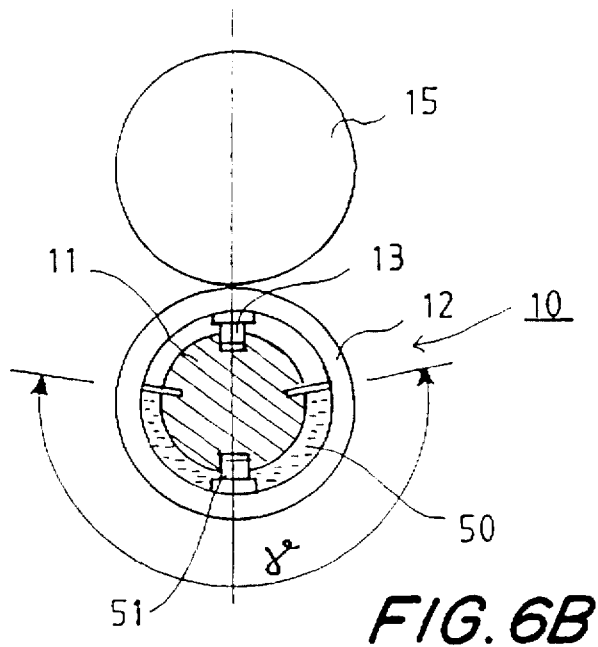
FIG. 6B is a schematic illustration of an exemplifying embodiment of the invention in which one backup chamber and one row of backup shoes are used.
Figure 6D:
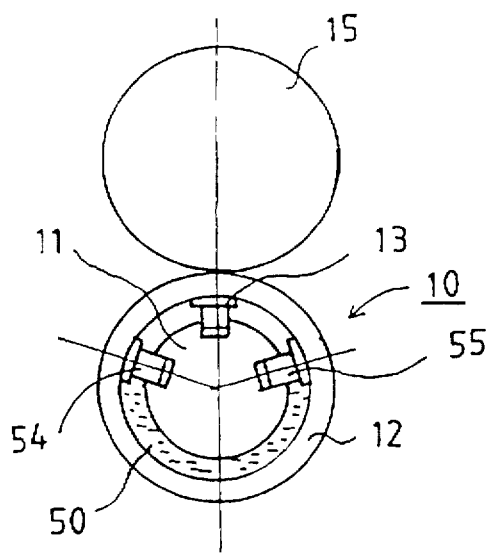
FIG. 6D is a schematic illustration of an exemplifying embodiment of the invention in which one backup chamber is used and in which two continuous backup shoes are used as seals of the chamber.
Figure 6C:
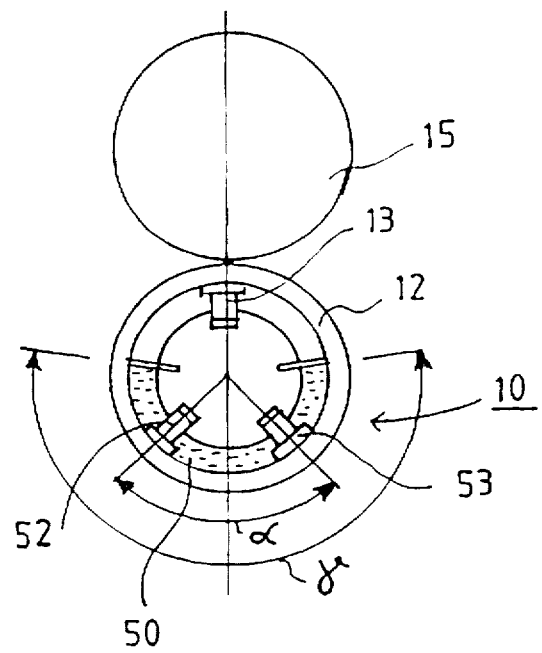
FIG. 6C is a schematic illustration of an exemplifying embodiment of the invention in which one backup chamber and two rows of backup shoes are used.

FIG. 6A shows an adjustable-crown roll 10 in which the backup zone has been formed by means of a backup-force chamber 50 in which a pressure medium is directed to cause a multitude of forces to be applied to the portions of the inner surface of the roll mantle defining the back-up chamber 50. FIG. 6B shows an adjustable-crown roll 10 in which the backup zone has been formed by means of a backup-force chamber 50 and one row of backup shoes 51. FIG. 6C shows an adjustable-crown roll 10 in which the backup zone has been formed by means of a backup-force chamber 50 and two rows of backup shoes 52,53. FIG. 6D shows an exemplifying embodiment of an adjustable-crown roll 10 in which continuous backup-shoe elements 54,55 are used as lateral seals of the backup-force chamber 50 in the axial direction. In FIGS. 6A–6D, the angle α, i.e., the angle between the backup-shoe elements 20,21 in the rows of backup shoes, is substantially larger than 0° and substantially smaller than 360°, and the width γ of the backup chamber is also substantially larger than 0° and substantially smaller than 360°. In the other respects, the exemplifying embodiments shown in FIGS. 6A"6D correspond to the exemplifying embodiments shown in FIGS. 1, 4A and 4B, and corresponding parts are denoted with the same reference numerals.

Figure 13A:
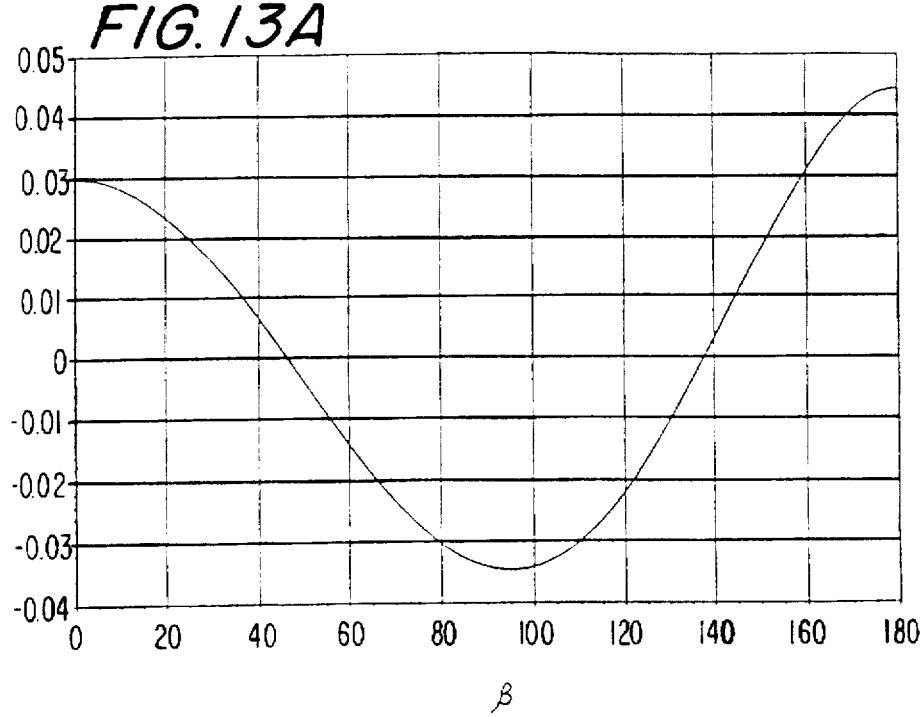
FIG. 13 illustrates the coefficient of deformation of the circumference when one row of backup shoes is used (prior art)
Figure 13:
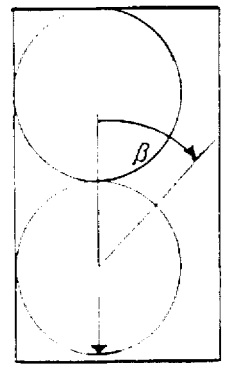

In FIGS. 7–19, various curves are presented in relation to different exemplifying embodiments of the invention and to a prior art construction. FIG. 7 illustrates the coefficient of deformation of the circumference when the adjustable-crown roll 10 includes two rows of backup shoes 21,22 and when the angle between the rows of backup shoes is about 92.6°. The vertical axis represents the coefficient of deformation of the circumference, and the horizontal axis represents the angle β (see the schematic presentation included in the figure). The coefficient of deformation of the circumference at the nip is 0when β=92.6°. FIG. 8 shows the curve of FIG. 7 in a polar system of coordinates. FIG. 9 illustrates the coefficient of circumferential moment in the situation illustrated in the above FIGS. 7 and 8 when two rows of backup shoes 20,21 are used and when the angle a is about 92.6° and while the deformation of the circumference at the nip is zero. The vertical axis represents the coefficient of circumferential moment, and the horizontal axis represents the angle β (see additional illustration alongside the figure). FIG. 10 illustrates the coefficient of circumferential moment when the angle between the two rows of backup shoes 20,21 is about 101.2°. The vertical axis represents the coefficient of circumferential moment, and the horizontal axis represents the angle β (see additional illustration alongside the figure). The curve shown in FIG. 12 is related to an exemplifying embodiment in which there are three rows of backup shoes 30,31,32, and the figure shows the coefficient of deformation of the circumference when $W_2$=0.437 $W_1$. The curve shown in FIG. 13 illustrates the coefficient of deformation of the circumference in a prior-art arrangement in which there is one row of backup shoes. The vertical axis represents the coefficient of deformation of the circumference, and the horizontal axis represents the angle β (see illustration alongside the figure). FIG. 14 shows the coefficient of deformation of the circumference as illustrated in FIG. 13 in a polar system of coordinates. Further, FIG. 15 illustrates the coefficient of circumferential moment in a prior art construction in which there is one row of backup shoes. The vertical axis represents the coefficient of circumferential moment, and the horizontal axis represents the angle B (see additional illustration alongside the figure), and FIG. 16 shows the curve of FIG. 15 in a polar system of coordinates.

Figure 19:
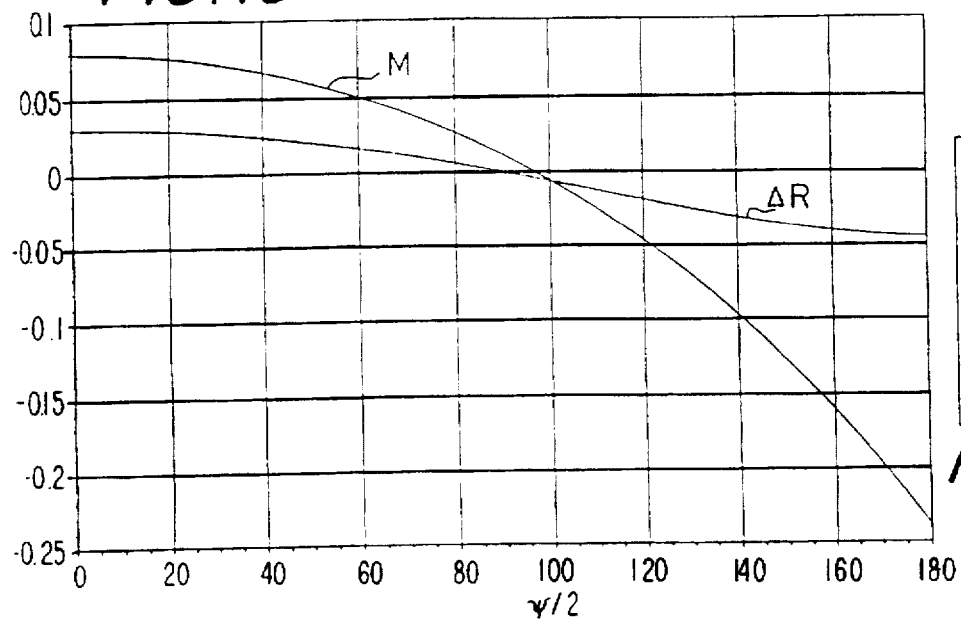
FIG. 19 illustrates the coefficient of circumferential moment and the coefficient of deformation of the circumference at the nip when one backup chamber is used.
Figure 19A:
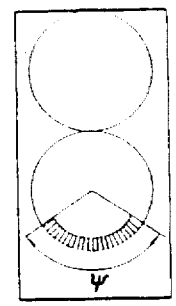

FIG. 17 illustrates the coefficient M of circumferential moment and the coefficient ΔR of deformation of the circumference at the nip with different values of the angle α between the rows of backup shoes when two rows of backup shoes are used. The vertical axis represents the coefficient, and the horizontal axis represents the angle α (see additional illustration in the figure). The coefficient ΔR of deformation of the circumference receives the value 0 when the angle α is about 92.60. The coefficient M of circumferential moment receives the value 0 when the angle α is about 101.2°. FIG. 18 illustrates the coefficients M,ΔR of circumferential moment and deformation of the circumference at the nip in relation to an exemplifying embodiment with three rows of backup shoes 30,31,32, in which the angle α is 180° and the ratio $W_2/W_1$ (horizontal axis) varies within the range of 0–1. From the figure it is seen that with the values 0.437–0.438 of the ratio, both of the coefficients are substantially zero. The curve shown in FIG. 19 shows the coefficient M of circumferential moment and the coefficient ΔR of deformation of the circumference with different values of the width γ/2 of the backup chamber (horizontal axis) while the backup force remains invariable. From the figure, it is seen that the coefficient of circumferential moment is 0 when γ is 193.6°, and the coefficient of deformation of the circumference is 0 when γ is 180°.

The examples provided above are not meant to be exclusive. Many other variations of the present invention would be obvious to those skilled in the art, and are contemplated to be within the scope of the appended claims. For example, in the above descriptions of an adjustable-crown roll with two rows of backup zone elements, the parameter which is varied is the angle between the rows. However, it is understood that the two rows may or may not be situated symmetric with respect to the nip plane. Also, it is obvious that any number of backup-zone elements and/or backup chambers can be positioned between the roll mantle and the roll axle in the accordance with the desired situation.

I claim:

1. A method for regulating loading of an adjustable-crown roll defining a nip with a back-up roll, said adjustable-crown roll having a stationary roll axle, a roll mantle rotatingly mounted on said roll axle, and loading means arranged on said roll axle in engagement with an inner face of said roll mantle, comprising the steps of:

applying a loading force from said loading means in a nip-loading direction to regulate deflection of said roll mantle and/or a linear load in the nip, the nip-loading direction being the direction toward the nip in a nip plane defined as the plane passing through a central axis of said adjustable-crown roll and a central axis of said back-up roll applying a force to the inner face of said roll mantle at each of a plurality of different locations in the circumferential direction of said roll and in a different directions to produce a resultant force therefrom acting only in the nip plane in a direction substantially opposite to the nip-loading direction.

2. The method of claim 1, wherein the step of applying a force to the inner face of said roll mantle at each of said locations comprises the steps of:

applying a first force at a first circumferential location of the inner face of said roll mantle by means of a first longitudinal row of backup-zone elements mounted on said roll axle in engagement with the inner face of said roll mantle, and applying at least one additional force at a respective additional circumferential location of the inner face of said roll mantle different than said first circumferential location and other of said additional circumferential locations by means of a respective additional longitudinal row of backup-zone elements mounted on said roll axle in engagement with the inner face of said roll mantle.

3. The method of claim 1, wherein the step of applying a force to the inner face of said roll mantle at each of said locations comprises the steps of:

arranging at least one backup chamber between said roll mantle and said roll axle each extending over an inner surface region of said roll mantle, and regulating the flow of a pressure medium into each of said at least one backup chamber.

4. The method of claim 1, wherein the step of applying a force to the inner face of said roll mantle at each of said locations comprises the steps of:

applying at least one force at a respective circumferential location of the inner face of said roll mantle by means of a respective longitudinal row of backup-zone elements mounted on said roll axle in engagement with the inner face of said roll mantle, arranging at least one backup chamber between said roll mantle and said roll axle each extending over an inner surface region of said roll mantle, and regulating the flow of a pressure medium into each of said at least one backup chamber.

5. The method of claim 1, wherein the step of applying a force to the inner face of said roll mantle at each of said locations comprises the step of applying a substantially constant force at each of said locations.

6. The method of claim 1, further comprising the step of regulating the force applied to the inner face of said roll mantle at each of said locations in order to produce the resultant force therefrom acting only in the nip plane in the direction substantially opposite to the nip-loading direction.

7. The method of claim 1, wherein the force applied to the inner face of said roll mantle at each of said locations is regulated independently of the force applied to other of said locations.

8. The method of claim 1, further comprising the step of selecting the locations at which a force is applied to the inner face of said roll mantle to minimize deformation of the circumferential shape of said roll mantle at said nip produced by the application of the forces.

9. The method of claim 1, further comprising the step of selecting the locations at which a respective one of the forces is applied to the inner face of said roll mantle to minimize circumferential stresses in said roll mantle at the nip which produced by the application of the forces.

10. The method of claim 1, further comprising the step of selecting the locations at which a respective one of the forces is applied to the inner face of said roll mantle to minimize overall stresses in said roll mantle.

11. An adjustable-crown roll arranged to define a nip with a backup roll, comprising a stationary roll axle, a roll mantle rotatingly mounted on said roll axle and having an inner face, loading means supported on said roll axle in engagement with said inner face of said roll mantle for loading said roll mantle in a nip-loading direction, the nip-loading direction being the direction toward the nip in a nip plane defined as the plane passing through a central axis of said adjustable-crown roll and a central axis of said backup roll and backup force applying means supported on said roll axle for applying a plurality of backup forces against said inner face of said roll mantle in different directions, said backup force applying means being regulated to produce a resultant force from the backup forces which acts only in the nip plane in a direction substantially opposite to the nip-loading direction.

12. The roll of claim 11, wherein said backup force applying means comprises at least two longitudinal rows of backup-zone elements arranged on said roll axle in engagement with the inner face of said roll mantle.

13. The roll of claim 11, wherein said backup force applying means comprises at least one pressurizeable backup chamber defined between said roll mantle and said roll axle extending over a circumferential portion of said roll mantle.

14. The roll of claim 11, wherein said backup force applying means comprises
at least one longitudinal row of backup-zone elements arranged on said roll axle in engagement with the inner face of said roll mantle, and
at least one pressurizeable backup chamber defined between said roll mantle and said roll axle each extending over a circumferential portion of said roll mantle.

15. The roll of claim 11, wherein said backup force applying means comprises at least one longitudinal row of backup-zone elements arranged on said roll axle in engagement with the inner face of said roll mantle, said at least one longitudinal row of backup-zone elements extending substantially over the entire axial length of said roll and said backup-zone elements being spaced in said at least one longitudinal row at a set distance from one another.

16. The roll of claim 11, wherein said backup force applying means comprises at least one continuous backup shoe extending substantially over the entire axial length of said roll.

17. The roll of claim 13, wherein said at least one backup chamber extends substantially over the entire axial length of said roll.

18. The roll of claim 11, wherein said backup force applying means comprises at least one longitudinal row of backup-zone elements arranged on said roll axle in engagement with the inner face of said roll mantle, said loading means comprising a plurality of loading elements spaced from one another, said backup zone elements in said at least one longitudinal row being spaced from one another in a spacing pattern different than the spacing pattern of said loading elements.

19. The roll of claim 11, wherein said backup force applying means comprises at least one longitudinal row of backup-zone elements arranged on said roll axle in engagement with the inner face of said roll mantle, said loading means comprising a longitudinal row of loading elements spaced at a set distance from one another, said at least one longitudinal row of backup-zone elements being spaced a set distance from one another which is the same distance as the spacing between said loading elements, each of said backup-zone elements being situated in alignment with one of said loading elements.

20. The roll of claim 11, wherein said backup force applying means comprises at least one longitudinal row of backup-zone elements arranged on said roll axle in engagement with the inner face of said roll mantle, said loading means comprising a longitudinal row of loading elements spaced at a set distance from one another, said at least one row of backup zone elements having fewer backup-zone elements than the number of loading elements such that said backup-zone elements are situated in alignment with every other one of said loading elements or every third one of said loading elements.

21. The roll of claim 12, wherein said at least two rows of backup-zone elements comprises two rows arranged so that an angle between said rows is greater than 0° to about 180°.

22. The roll of claim 12, wherein said at least two rows of backup-zone elements comprises two rows arranged substantially symmetrically to the nip plane and the angle between said rows being from about 50° to about 140°.

23. The roll of claim 22, wherein the angle between said rows said loading means comprise is selected from the group consisting of an angle of 92.6°, an angle of 102.2° and an angle of 120°.

24. The roll of claim 12, wherein said loading means comprise a longitudinal row of loading elements, said at least two rows of backup-zone elements comprise a first, middle and last row, the angle between said first and last row being substantially larger than 0° and substantially smaller than 360°, and the angle between said middle row of backup-zone elements and said loading elements being substantially 180°.

25. The roll of claim 12, wherein said at least two rows of backup-zone elements comprises at least four rows.

26. The roll of claim 24, wherein said first and last rows of backup-zone elements are arranged symmetrically in relation to the nip plane, and the angle between said first and last rows being 180°.

27. The roll of claim 24, wherein the ratio of the forces produced by said backup-zone elements in said first and last rows of backup-zone elements to the forces produced by said backup-zone elements in said middle row of backup-zone elements is from about 0.1 to 1.2.

28. The roll of claim 13, wherein the circumferential portion of said at least one backup chamber is substantially larger than zero and substantially smaller than 360°.

29. The roll of claim 28, wherein the circumferential portion of said at least one backup chamber is from about 80° to about 300°.

30. The roll of claim 14, wherein said at least one row of backup-zone elements is arranged at least in part within a respective one of said at least one backup chamber.

31. The roll of claim 11, wherein said backup force applying means comprises
at least two continuous backup shoes extending substantially over the entire axial length of said roll in engagement with the inner face of said roll mantle, and
at least one pressurizeable backup chamber defined between a respective pair of said at least two continuous backup shoes, each of said at least one backup chamber extending over a circumferential portion of said roll mantle, said at least two continuous backup shoes constituting axial seals of the respective one of said at least one backup chamber.

32. A method for regulating loading of an adjustable-crown roll defining a nip with a back-up roll, said adjustable-crown roll having a stationary roll axle, a roll mantle rotatingly mounted on said roll axle, and loading means arranged on said roll axle in engagement with an inner face of said roll mantle, comprising the steps of
applying a loading force from said loading means in a nip-loading direction to regulate deflection of said roll mantle and/or a linear load in the nip, the nip-loading direction being the direction toward the nip in a nip plane defined as the plane passing through a central axis of said adjustable-crown roll and a central axis of said back-up roll, and
applying a force to the inner face of said roll mantle at each of a plurality of different locations in the circumferential direction of said roll to produce a sum force acting in the nip plane in a direction substantially opposite to the nip-loading direction, the step of applying a force to the inner face of said roll mantle at each of said locations comprising the steps of:

arranging at least one backup chamber between said roll mantle and said roll axle each extending over an inner surface region of said roll mantle, and regulating the flow of a pressure medium into each of said at least one backup chamber.

33. A method for regulating loading of an adjustable-crown roll defining a nip with a back-up roll, said adjustable-crown roll having a stationary roll axle, a roll mantle rotatingly mounted on said roll axle, and loading means arranged on said roll axle in engagement with an inner face of said roll mantle, comprising the steps of:

applying a loading force from said loading means in a nip-loading direction to regulate deflection of said roll mantle and/or a linear load in the nip, the nip-loading direction being the direction toward the nip in a nip plane defined as the plane passing through a central axis of said adjustable-crown roll and a central axis of said back-up roll, and applying a force to the inner face of said roll mantle at each of a plurality of different locations in the circumferential direction of said roll to produce a sum force acting in the nip plane in a direction substantially opposite to the nip-loading direction, the step of applying a force to the inner face of said roll mantle at each of said locations comprising the steps of:

applying at least one force at a respective circumferential location of the inner face of said roll mantle by means of a respective longitudinal row of backup-zone elements mounted on said roll axle in engagement with the inner face of said roll mantle, arranging at least one backup chamber between said roll mantle and said roll axle each extending over an inner surface region of said roll mantle, and regulating the flow of a pressure medium into each of said at least one backup chamber.

34. An adjustable-crown roll arranged to define a nip with a backup roll, comprising a stationary roll axle, a roll mantle rotatingly mounted on said roll axle and having an inner face, loading means supported on said roll axle in engagement with said inner face of said roll mantle for loading said roll mantle in a nip-loading direction, the nip-loading direction being the direction toward the nip in a nip plane defined as the plane passing through a central axis of said adjustable-crown roll and a central axis of said backup roll, and backup force applying means supported on said roll axle for applying a plurality of backup forces against said inner face of said roll mantle in different directions such that the sum of the backup forces is in the nip plane and in a direction substantially opposite to the nip-loading direction, said backup force applying means comprising at least one longitudinal row of backup-zone elements arranged on said roll axle in engagement with the inner face of said roll mantle, and at least one pressurizeable backup chamber defined between said roll mantle and said roll axle, each of said at least one backup chamber extending over a circumferential portion of said inner face of said roll mantle.

35. The roll of claim 34, wherein said at least one row of backup-zone elements is arranged at least in part within a respective one of said at least one backup chamber.

36. An adjustable-crown roll arranged to define a nip with a backup roll, comprising a stationary roll axle, a roll mantle rotatingly mounted on said roll axle and having an inner face, loading means supported on said roll axle in engagement with said inner face of said roll mantle for loading said roll mantle in a nip-loading direction, the nip-loading direction being the direction toward the nip in a nip plane defined as the plane passing through a central axis of said adjustable-crown roll and a central axis of said backup roll and backup force applying means supported on said roll axle for applying a plurality of backup forces against said inner face of said roll mantle in different directions such that the sum of the backup forces is in the nip plane and in a direction substantially opposite to the nip-loading direction, said backup force applying means comprising at least two continuous backup shoes extending substantially over the entire axial length of said roll in engagement with the inner face of said roll mantle, and at least one pressurizeable backup chamber defined between said at least two continuous backup shoes, each of said at least one backup chamber extending over a circumferential portion of said inner face of said roll mantle such that said at least two continuous backup shoes constitute axial seals of a respective one of said at least one backup chamber.

* * * * *